United States Patent [19]

Kennedy

[11] Patent Number: 4,637,090
[45] Date of Patent: Jan. 20, 1987

[54] PLASTIC SCRAPER

[76] Inventor: Jim Kennedy, 324 Streamwood Blvd., Streamwood, Ill. 60103

[21] Appl. No.: 723,174

[22] Filed: Apr. 15, 1985

[51] Int. Cl.⁴ .............................. A47L 1/06; B60S 1/04
[52] U.S. Cl. ..................................... 15/236 R; 30/172
[58] Field of Search ................. 15/236 R, 236 A, 245; 30/169, 172

[56] References Cited

U.S. PATENT DOCUMENTS

| | | | |
|---|---|---|---|
| 3,133,301 | 5/1964 | Helminen | 15/245 |
| 3,214,834 | 2/1964 | Bell | 30/169 |
| 3,566,430 | 12/1968 | Young | 15/236 R |
| 4,040,140 | 8/1977 | Hopkins et al. | 15/236 R |
| 4,121,316 | 10/1978 | Perry | 15/236 R |
| 4,275,476 | 6/1981 | Hopkins et al. | 15/236 R |
| 4,305,175 | 12/1981 | Burgess, Jr. | 15/236 R |
| 4,363,155 | 12/1982 | Regina | 15/236 R |

Primary Examiner—Edward L. Roberts
Attorney, Agent, or Firm—Hill, Van Santen, Steadman & Simpson

[57] ABSTRACT

A molded polygonally configured scraper which has a plurality of straight blade portions about the perimeter thereof. Preferably each blade portion has two raised edge members to facilitate scraping in opposed directions. One blade portion is supported by an angled wall configuration which permits fingers of the user to exert a maximum of force upon the blade portion.

10 Claims, 7 Drawing Figures

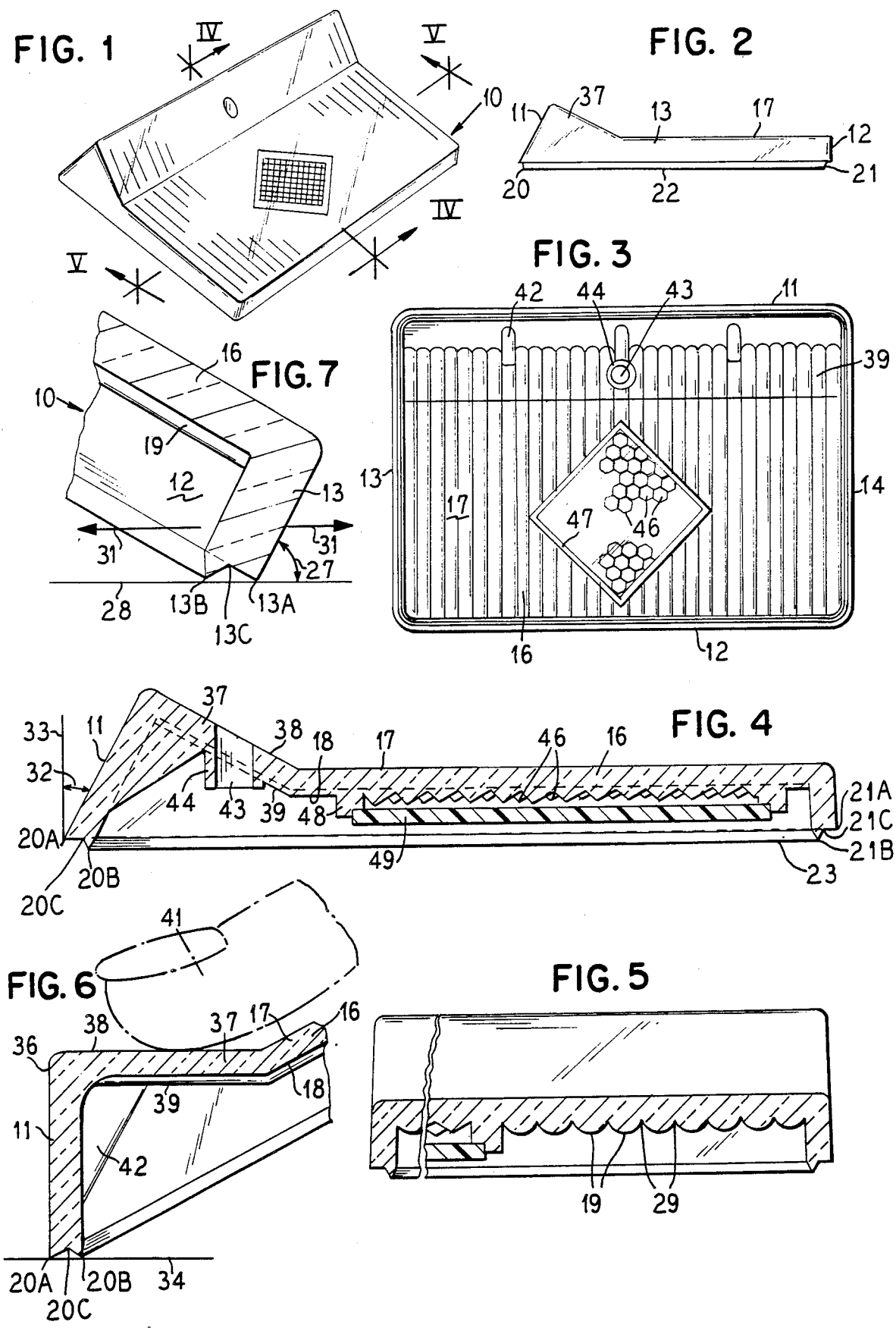

PLASTIC SCRAPER

BACKGROUND OF THE INVENTION

1. Field of the Invention

This invention lies in the field of scrapers for ice, paint, fish scales, and the like.

2. Prior Art

Hand-held scrapers for ice, paint, and the like formed of a single molded article of plastic material, such as polymethacrylate polycarbonate or the like, are commonly available. Such a scraper typically includes an elongate body defining a single scraper blade at one end thereof. From the blade region, a body is associated which is so formed as to include a hand gripable region.

When the blade becomes worn or damaged in use, the life of the scraper is typically over.

Furthermore, the size and shape of many prior art scrapers makes such bulky, difficult to be held at an angle to the surface to be scraped for efficient scraping purposes, and generally without any possibility of use for alternative or other purposes.

SUMMARY OF THE INVENTION

The present invention provides a new polygonally configured plastic scraper which can be formed if desired of a single piece of molded plastic material and which is provided with a plurality of integrally formed perimeter blade regions, usually four. At least one, and preferably all, of the blade regions is provided with two defined edges, each one of such edges being in a transversely spaced parallel relationship to the other thereof.

Thus, one feature of the present invention is that the scraper provides a plurality of scraping blade surface. Hence, an embodiment of the present invention has a long duty life because of the fact that a plurality of blades, each preferably provided with a pair edges, wears better than the single blade structures of the prior art. By providing a plurality of blade regions, the dulling or damaging of an individual blade surface does not prevent continued use of the scraper by utilizing remaining blades thereof.

Another feature of the present invention is the provision of blade regions in a scraper which are each providable with two cutting edges as indicated. Thus, a scraper is adapted for effective scraping action in each direction of the back and forth scraping movements such as are accomplished by the to and fro movements exerted by the hand and forearm of a user. Thus, frost, ice, snow, and the like are removable from an automobile window or the like in a rapid and efficient manner as scraping is accomplished from each side of a scraper blade of the present invention.

By employing a pair of cutting edges with each scraper blade, it appears that a more efficient, chip-resistant blade with a longer duty life is achieved compared to prior art blade structures having but a single cutting edge portion incorporated thereinto.

Another aspect of the present invention is that a flattened scraper is provided with a raised region adjacent one blade-equipped side edge portion thereof. The raised region provides a finger-end abutting inclined surface region which aids in retaining and aligning the fingers, and such raised region is oriented as to provide a region against which a force applied from the hand of the user can be substantially vertically exerted against a surface being scraped in close proximity thereto for maximum scraping efficiency and power. Also, in use, the scraping blade surface of such one side edge is orientable so that it assumes substantially a perpendicular position with relation to the particular surface being scraped, such as a windshield, board surface, or the like, yet the body of the scraper is inclined at an angle so as to permit convenient application of force vectors in directions generally parallel to the surface being scraped, thereby to permit easy back and forth scraping movements to be accomplished relative to the underlying surface being scraped.

An object of the present invention is to provide an inexpensive hand-held scraper which is economical to make, easy to use, and efficient to operate relative to prior art scrapers.

In accordance with another aspect of the present invention, the scraper of the present invention is formed so as to have the capability of being useful for purposes other than scraping. For example, and also preferably, a scraper embodiment of the present invention incorporated delineation means, such as retroreflective reflector means so as to permit the body of a scraper to be used for such purposes as roadway signaling emergencies, delineating camp sites or summer cottages, marking vehicular (including automobiles, boats, trucks and the like) parts as well as stationary objects such as parking markers, docks, driveways, and the like. Such a reflex reflective area can be incorporated into a flattened body region of a reflector embodiment of the present invention.

In a presently preferred embodiment of the present invention, a scraper has a generally rectangular perimeter configuration with each perimeter length being provided with its own scraper blade.

Other and further features, aims, objects, purposes, advantages, uses, and the like for the present invention will be apparent to those skilled in the art from the appended drawings and the following description of some preferred embodiments of the present invention.

BRIEF DESCRIPTION OF DRAWINGS

In the drawings:

FIG. 1 is a perspective view of one embodiment of a scraper of the present invention;

FIG. 2 is a side elevational view of the embodiment shown in FIG. 1;

FIG. 3 is a bottom view of the embodiment shown in FIG. 1;

FIG. 4 is a vertical sectional view taken generally along the line IV—IV of FIG. 1;

FIG. 5 is a fragmentary vertical sectional view taken along the line V—V of FIG. 1;

FIG. 6 is an enlarged fragmentary vertical sectional view taken through the region of a forward edge of the embodiment shown in FIG. 1 illustrating the scraper in a cutting or scraping position; and FIG. 7 is similar to FIG. 6 but illustrating another edge of the FIG. 1 embodiment with the scraper in a cutting or scraping configuration.

DETAILED DESCRIPTION

Referring to the drawings there is seen one presently preferred embodiment of the present invention which is herein designated in its entirety by the numeral 10. Scraper 10 has a generally rectangular configuration comprising longitudinal sides 11 and 12 and transverse sides 13 and 14, respectively. The sides 11, 12, 13, and 14 are generally straight relative to a central, generally flattened plate 16 which is provided with a generally smooth top face 17 and a generally corrugated bottom face 18. The corrugations in the bottom face 18 are defined by a plurality of raised hills 19 with intervening depressions or valleys 29 all of which extend in generally spaced, parallel relationship to one another, as shown, for example in FIGS. 1, 3 and especially FIG. 5, the primary purpose of such corrugations being to enhance the strength and rigidity of the scraper 10. Other integral reinforcing designs for bottom face 18 can be employed, as desired.

The sides 11, 12, 13, and 14 are generally upstand as continuous integral flange-like extensions relative to bottom face 18 so that each such side terminates in a straight blade 20, 21, 22, and 23, respectively, for each of the sides 11, 12, 13, and 14. The surfaces of these blades are generally coplanar, as shown, for example, in FIGS. 2 and 4.

At least one and preferably all of such blades 20, 21, 22, and 23 is provided (as shown) with a pair of cutting edges identified as A and B, respectively, for each such blade, the outermost edge being designated by A and the innermost edge being designated by B. Thus, for example, the outer cutting edge of blade 20 is designated as 20A while the innermost cutting edge is designated as 20B. Each cutting edge A is in generally spaced, parallel relationship to cutting edge B for each blade 20, 21, 22, and 23, respectively. A depressed valley region C extends along between each cutting edge A and B in each blade 20, 21, 22, and 23, as shown, for example, in FIG. 4.

The cutting edges A and B of each respective blade 20, 21, 22, and 23 are arranged so that when an associated side 11, 12, 13, or 14, respectively, is inclined at some predetermined angle, for example, the angle 27 in FIG. 7, the respective cutting edges A and B are each in contact with a surface, for example, surface 28 in FIG. 7 to be scraped. While the angle 27 as shown in FIG. 7 represents a presently preferred angle and is approximately 30°, the angle 27 can conveniently fall in a range extending from about 15° to 80°, or otherwise, if desired, depending upon such variables as the particular end use application intended, the wishes of the designer for a particular embodiment for a scraper of this invention, and the like. When a side, such as 13, is so inclined at such an angle 27, the plate 16 is inclined at a corresponding similar angle which permits easy and convenient grasping of the scraper 10 by the hand of a user. Also, such an angle 27 permits achievement of reciprocatory to and fro movements of a scraper 10 over a surface 28 in the opposed directions illustrated by the arrows 31 in FIG. 7 so that the desired scraping can be accomplished readily.

While some of the sides, here illustratively the sides 12, 13, and 14, respectively, generally extend perpendicularly relative to the plate 16, at least one side, here illustratively the side 11, is formed so as to be inclined at an angle 32 with respect to the vertical 33 (or with respect to the plate 16 at a corresponding angle), as illustrated for example in FIG. 4. The angle 32 shown in the embodiment 10 represents a presently preferred angle and is approximately 30°; however, as those skilled in the art will appreciate, the angle 32 can conveniently vary over a wide range, for example, from about 15° to 80°, or otherwise, if desired, depending upon preferences and the like. Thus, when the plate 16 is inclined with respect to the horizontal at an angle of about 30° in the scraper embodiment 10, the side 11 is adapted to assume a generally vertical configuration with respect to a surface 34 to be scraped, as illustrated, for example, in FIG. 6. When the side 11 is thus vertically oriented, the arrangement of cutting edge 20A and of cutting edge 20B is preferably such that both such edges are in contact with such surface 34, thereby permitting both such edges to be employed in scraping by the usual to and fro (or back and forth) scraping movements of the scraper 10 in operation.

Also in scraper 10, the region between the upper end 36 of side 11 and adjacent portions of the plate 16 are inclined so as to provide a finger abutting, elongated, generally rectangularly configured platform 37 whose upper flattened inclined face 38 is generally smooth and whose interior face 39 is generally configured so as to be, in the illustrative embodiment 10 shown, an extension of reinforcing design associated with the bottom face 18. Preferably, and as shown, when side 11 is vertically oriented relative to a surface 34, the platform 37 extends generally horizontally, as shown in FIG. 6. Thus, when the fingertips 41 of a user rest against the platform 37, as illustrated in FIG. 6, a maximum amount of downward force may be exerted against platform 37 and side 11, and, in turn, upon cutting edges 20A and 20B, thereby to facilitate application of a maximum scraping force against the surface 34. Conveniently, the bottom face 18 has a portion thereof which is concurrently in contact with the thumb of the user so as to permit grasping of scraper 10 in a manner to stabilize and rigidify the scraper 10 in a desired position during a scraping operation.

To strengthen structurally scraper 10, a plurality of ribs 42 (three in the embodiment shown) are optionally provided which upstand and interconnect the inside face of side 11 with the interior face 39 of platform 37.

For possible use in storing or mounting the scraper 10 when such is not being used for scraping, a mounting orifice 43 is conveniently but optionally formed in the scraper 10, the orifice 43 here being provided in a midregion of the platform 37, and the orifice 43 additionally being supplied with a circumferentially extending tubularly configured extension 44 which inwardly upstands from interior face 39 (see FIGS. 3 and 4).

The central region of bottom face 18 in embodiment 10 has integrally formed thereinto a plurality of individual retroreflective facets 46 of the conventional hexagonal perimeter configuration, all of the facets 46 here being grouped together to form a diamond-like configuration 47. About the perimeter of configuration 47, a raised or upstanding flange 48 is provided whose exposed shoulder region is adapted to receive and support a backer plate 49. The perimeter regions of the backer plate 49 are sealed to contacting portions of the flange 48 by means of an adhesive, ultrasonic welding, or the like, thereby to provide protection against environmental contamination for the facets 46 formed in bottom face 18. Inclusion of such a built in hermetically sealed reflector area into the scraper 10 enhances the utilities possible therefore. Also, such reflector area improves the safety features of the scraper 10. Not only does the user thereby enhance his identification to a nearby motorist when the user is scraping surfaces of automobile glass or the like, but also the scraper 10 can serve in various other delineation capacities, such as a driveway marker, a boat or dock marker, a campsite marker, a vehicular marker in roadway emergencies, and the like. Such multifunctional use capability from the standpoint of the user is desirable since storage space considerations commonly limit the number of tools which a vehicle operator can take with him on board his vehicle, and it therefore desirable that each individual tool have as much practicality and utility as is possible, as those skilled in the art will appreciate.

Since the scraper 10 thus has four blades and each blade preferably has two cutting edges, as shown, the scraper 10 contains a total of eight scraping edges. Such arrangement provides long life use capabilities for the scraper 10, particularly since the loss or dulling of any one of the cutting edges does not terminate the useful life of a scraper 10, such as is the case with most prior art scrapers. Furthermore, the presence of a pair of cutting edges in a single blade appears to enhance various scraping operations such as the removal of ice, frost, fish scales, paint, and the like from a contaminated surface since the two-way scraping action made possible particularly by an appropriate inclining of a scraper 10 (as described above) enhances scraping efficiency and effectiveness.

Those skilled in the art will appreciate that various convex polygonal perimeter configurations are possible for a scraper embodiment of the present invention, however, the present four-sided configuration of the scraper 10 is preferred. For one thing, if three sides or five sides are employed, then corner pointed regions develop which can be uncomfortable to the hand of a user. A four sided rectangular configuration as shown appears to offer an excellent balance of such properties as side length, user comfort, scraping efficiency and the like, and in particular the configuration of scraper 10 appears to offer a maximum utilization for incorporating the combination of inclined side wall and finger abutting plate along one side thereof. Such a configuration, as described above, affords a maximum application of manual force against a surface to be scraped, and the blade associated with such inclined side wall can incorporate two cutting edges such as 20A and 20B. Thus, the forces developable by the hand of a user work to provide an effective combination of intimate contacting and scraping between such cutting edges and a surface being scraped, and yet, at the same time the hand of the user is moveable with the scraper 10 firmly grasped for achieving the desired back and forth scraping movements.

In the preferred embodiment shown, the innermost cutting edge B continuously extends about the respective blades 20, 21, 22, and 23 and in effect thus provides an added rigidification mean for a scraper 10.

Although the molded scraper is well suited for scraping flat hard surfaces such as glass, wood and metal, etc. it has wide application for scraping many other surfaces as well. For example, it has been found effective for use as a fish scraper or scaler and on many irregular surfaces as well.

Although the teachings of my invention have herein been discussed and illustrated primarily with reference to specific embodiments, it is to be understood that such is by way of illustration only and that others may wish to utilize my invention in different designs or applications.

I claim:

1. A molded scraper for removing deposits from surfaces comprising:
    (A) a central generally flattened plate portion having generally opposed front and back faces and having a polygonal straight sided perimeter configuration,
    (B) a plurality of integral flange-like continuous extensions upstanding from said back face along said sides and terminating in generally straight blade portions which are generally mutually coplanar with one another,
    (C) at least one of said straight blade portions having defined therein a pair of longitudinal continuously extending edge members in spaced parallel relationship to one another,
    (D) the interrelationship between said edge members of each such pair being such that both of said edge members generally contact a flattened surface when said central plate portion is inclined relative to said surface at a predetermined first acute angle,
    (E) at least one of said extensions being oriented at a predetermined second acute angle relative to said central plate portion,
    (F) each said at least one extension terminating in space relationship to said blade portion thereof at a location elevated with respect to said front face, and
    (G) a finger abutting plate portion means integrally associated each of said at least one extension terminating locations both with said central plate portion and with adjacent areas of others of said extensions, said finger abutting plate portion means being oriented spacially and, configured to have a front face portion thereof extend generally parallel to said surface when said central plate portion is so inclined.

2. The scraper of claim 1 wherein central plate portion is rectangularly configured.

3. The scraper of claim 1 wherein each of said blade portions has said pair of edge members.

4. The scraper of claim 1 wherein said first acute angle extends from about 15° to 80°.

5. The scraper of claim 1 wherein said second acute angle extends from about 15° to 80°.

6. The scraper of claim 1 wherein only one of said side wall portions is so inclined and is so integrally associated with a said retaining plate portion.

7. The scraper of claim 1 wherein portions of said extensions are inclined generally normally to said central plate.

8. A molded scraper for removing unwanted materials from surfaces comprising:
    (A) a central generally flattened plate portion having generally opposed front and back faces and having four generally rectangularly configured straight sides,
    (B) a side wall portion upstanding from said back face along each said side, each side wall portion terminating in a straight blade configuration, said blade configurations being generally mutually coplanar with one another,
    (C) each blade configuration having defined therein a pair of longitudinally continuously extending edge members in transversely spaced parallel relationship to one another,
    (D) the interrelationship between said edge members of each of such pair being such that both of said edge members generally contact a flattened surface when said central plate portion is inclined relation to said surface at a predetermined first angle,
    (E) one of said side wall portions being oriented at a predetermined second acute angle relative to said plate, thereby making said one side wall portion generally perpendicular to said surface when said central plate portion is so inclined, (F) said one side wall portion terminating in spaced relationship to said blade configuration thereof in elevated relationship with respect to said front face, (G) a retaining plate portion integrally associating said terminating one side wall portion with said central plate portion and with adjacent areas of said side wall portions, said retaining plate portion being generally oriented and configured to have a front facial portion thereof extended generally parallel to said surface when said central plate portion is so inclined.

9. The scraper of claim 8 wherein said first acute angle is about 30° and said second acute angle is about 30°.

10. The scraper of claim 8 which includes a retroreflective region in said central plate portion.

* * * * *